April 22, 1958  H. A. WILSON ET AL  2,831,476
CRYSTAL CUTTING SAW
Filed April 9, 1957  2 Sheets-Sheet 1

INVENTORS
HENRY A. WILSON
RUSSELL W. FRAZIER
BY Wade Loomis
ATTORNEY
Arthur R. Parker
AGENT

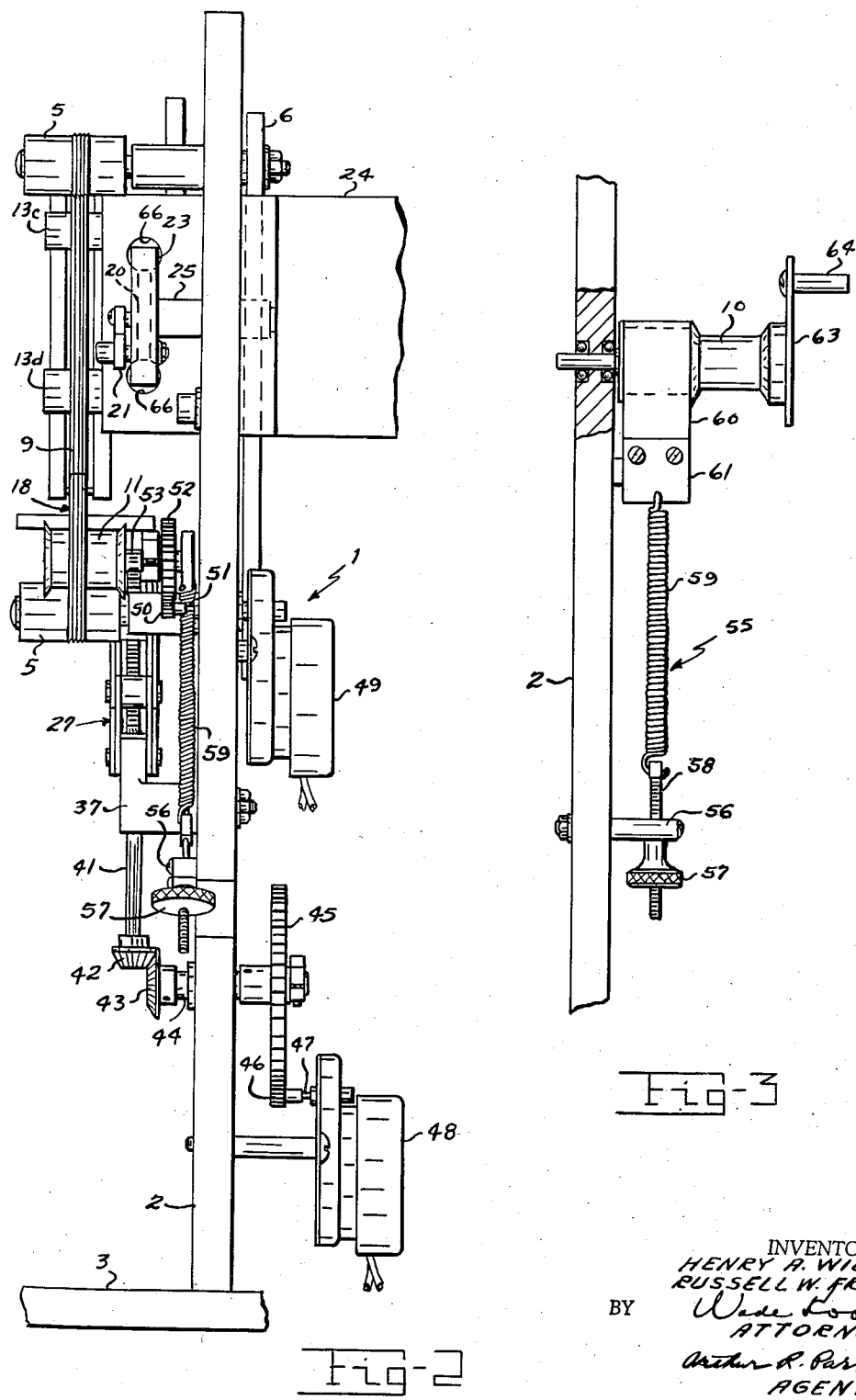

2,831,476

CRYSTAL CUTTING SAW

Henry A. Wilson, Dayton, and Russell W. Frazier, Wilmington, Ohio, assignors to the United States of America as represented by the Secretary of the Air Force Application April 9, 1957, Serial No. 651,769

11 Claims. (Cl. 125—12)

(Granted under Title 35, U. S. Code (1952), sec. 266)

The invention described herein may be manufactured and used by or for the United States Government for governmental purposes without payment to us of any royalty thereon.

This invention relates generally to a saw for cutting crystals and, more particularly, to a precision type saw for cutting extremely hard and brittle crystals, as for example, those of the cadmium sulfide type.

In the research of solid state physics, considerable use is made of an extremely hard variety of cadmium sulfide (CdS) crystal as a photoconductor, photovoltaic cell, gamma detector, and rectifier; however, the raw crystal may not be utilized until it has been processed or cut into the desired geometrics. Since the special type of cadmium sulfide crystal involved in the instant invention is extremely brittle in nature, the commercial diamond and microwave cutting processes have been found unsatisfactory for the reason that both methods tend to split and/or shatter the crystal. In the cutting saw of the present invention the probability of splitting or shattering the crystal is eliminated.

An object of the invention, therefore, resides in the provision of a unique and yet simple saw for the cutting of cadmium sulfide crystals.

A further object of the invention involves the use of a crystal cutting implement that eliminates the danger of splitting or shattering.

A still further object of the invention provides a precision saw that cuts the raw crystals into precise geometrics.

An additional object of the invention resides in the provision of a saw for precision cutting of crystals into predetermined segments of uniform or nonuniform thickness.

Another object of this invention utilizes a crystal saw that is manipulated simultaneously in two planes at right angles to one another in order to ensure effective cutting.

Other objects and advantages of the invention will become apparent from the following description, taken in connection with the accompanying drawings, in which like reference characters refer to like parts in the several figures:

Fig. 2 is a right-hand side view of the saw assembly of Fig. 1, illustrating details of the saw actuating means and the right-hand tension arrangement.

Fig. 3 is a left-hand side view of the left-hand tension arrangement utilized with the saw assembly of Figs. 1 and 2.

Figure 1:
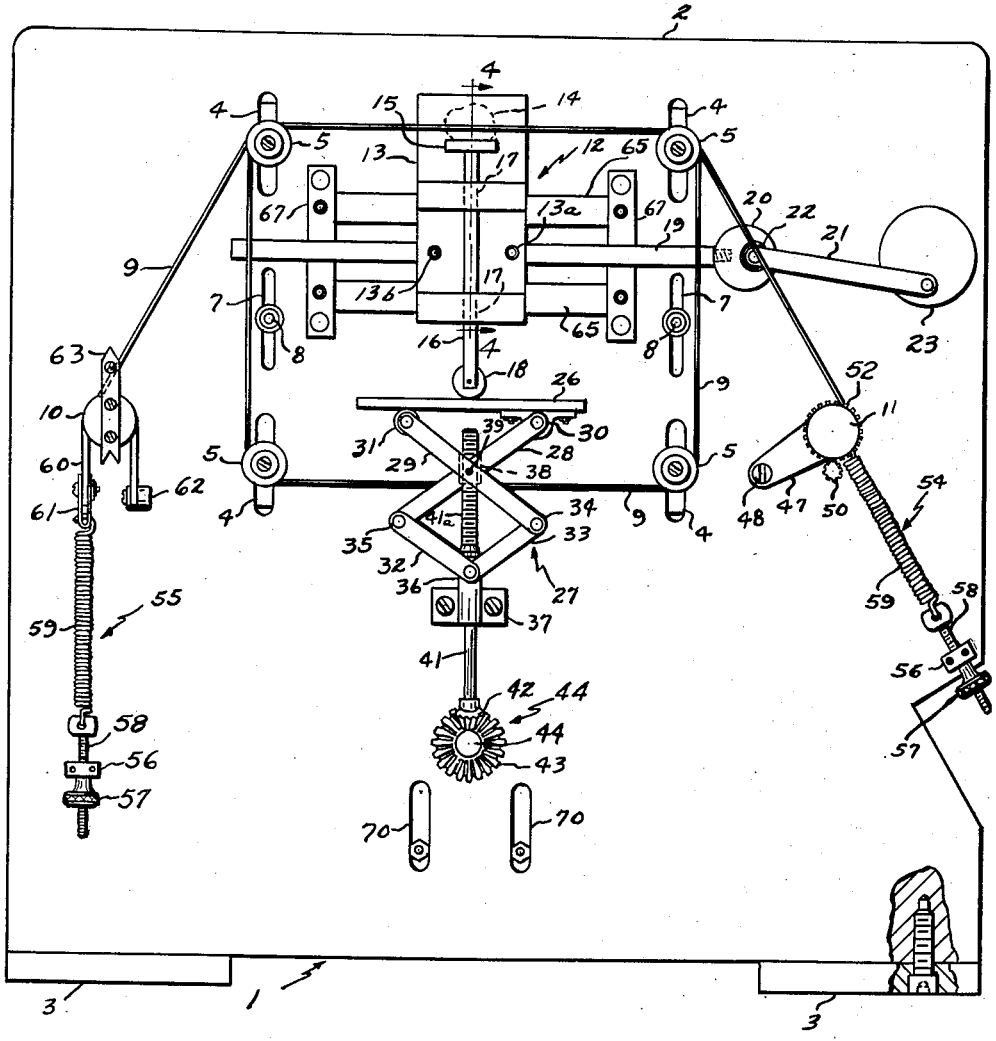
Fig. 1 is a front view of the saw assembly utilized in the invention, illustrating a crystal in cutting position on its supporting platform.
Figure 4:
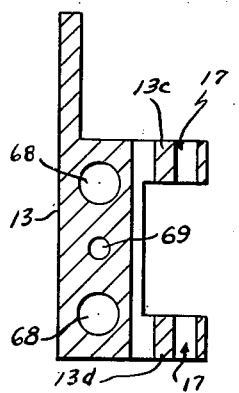
Fig. 4 is a view taken about on section 4—4 of Fig. 1, illustrating details of the carriage utilized in the invention but with the crystal mounting platform eliminated.

Referring particularly to Fig. 1 of the drawings, the device of the instant invention consists of a saw assembly indicated generally at 1 which assembly 1 includes a mounting panel 2 supported on plates 3. Said mounting panel 2 incorporates four elongated slots 4 through which slots 4 extend supporting shafts for four main drums 5 which drums 5 are mounted on a second plate 6 positioned behind mounting panel 2. Two additional elongated slots 7 are incorporated in panel 2 at an intermediate position relative to slots 4 in engagement with screws 8 to enable repositioning of plate 6 relative to panel 2. The saw member or cutting wire 9 is supplied from supply spool 10 which supply spool 10 is mounted on panel 2 in the manner clearly shown in Fig. 4 of the drawings. Said supply spool 10 is rotatably mounted on the panel 2 in any manner, as for example, by means of steel bearings. To set cutting assembly 1 in its operative position, said cutting wire 9 is drawn off spool 10 and threaded over each of said four drums 5. After completion of the threading operation, the end of said wire 9 is threaded over winding drum 11 which winding drum 11 is hinged to panel 2 by arm 47 and screw 48. It is noted that each of said drums 5 incorporates a plurality of spaced apart grooves so that cutting wire 9 may be wound one or more times over each drum to enable one or a plurality of cutting wires to engage with the crystal 14 to simultaneously cut the latter in a variety of widths as desired. In order to mount a crystal 14 in proper position for cutting, panel 2 is equipped with a guide system indicated generally at 12 and to be hereinafter explained in detail. A carriage 13 is mounted on said guide system 1 for horizontal reciprocation by actuating means to be described hereinafter. The crystal to be cut is schematically illustrated at 14 and is mounted on the platform 15 which platform 15 is, in turn, rigidly supported on carriage 13. Said crystal 14 is positively held or retained in position on platform 15 in any desired manner, as for example, by a mixture of 15% beeswax and 85% rosin. Said platform 15 incorporates a supporting arm or leg 16 depending from the bottom surface thereof which arm or leg is inserted into clearance holes or openings in carriage 13. Said openings or clearance holes are indicated at 17 in dotted lines in Fig. 1 and in section in Fig. 4. On the bottom end of said supporting arm or leg 16 is attached a roller 18 the purpose of which will be explained hereinafter. Said carriage 13 is affixed at 13a and 13b to an elongated drive member 19 which, in turn, is in threaded engagement with the relatively small, circular disc 20. A connecting link 21 is eccentically pivoted at one end at 22 to said disc 20 and at the other end to relatively large, circular disc 23. Said disc 23 is driven by a motor 24 and motor shaft 25, respectively (see Fig. 2).

Referring again particularly to Fig. 1 of the drawings, it is clearly seen that the previously mentioned roller 18 mounted on arm or leg 16 is in rolling contact with a second platform 26 which platform 26 may be raised or lowered by means of the power actuated lazy tongs assembly indicated generally at 27. Said lazy tongs assembly 27 includes a first pair of cross links 28 and 29 in contact at their upper ends with platform 26. Said cross link 28 is pivoted to the bottom of platform 26 at 30 and cross link 29 incorporates a roller 31 in rolling contact with the bottom of said platform 26. To the other ends of cross links 28 and 29 are pivoted the bottom links 32 and 33 at 34 and 35, respectively. Said bottom links 32 and 33 are pivoted to each other at pivot 36 which pivot 36 is positioned in a bracket 37 attached to panel 2. It is noted that there is a second identical lazy tongs linkage system positioned directly behind the first and mounted on respective pivots 30, 34, 35 and 36 which second linkage system is not visible in Fig. 1, but the lower part of which is visible in Fig. 2 of the drawings. A relatively short cylindrical sleeve 38 is mounted on the pivot between the parallel pair of cross links 28 and 29 which pivot is indicated at 39. Said lazy tongs linkage assembly 27 is actuated between its lower and upper positions by the power means indicated generally at 40. Said power means 40 includes a main power shaft 41 which extends through bracket 37 and threadably engages with cylindrical sleeve 38. Said sleeve 38 is internally threaded whereas the upper portion 41a of power shaft 41 is externally threaded so that rotation of the latter effects vertical movement of sleeve 38. Said vertical movement, likewise, effects similar movement of the pivot 39 and thus results in a raising and/or lowering of cross links 28 and 29 and the platform 26. As clearly seen in Fig. 1 of the drawings, raising and lowering of said platform 26, also, raises and lowers the crystal-mounting platform 15 through its supporting arm or leg 16 and roller 18 which roller 18 is in rolling contact with said platform 15. The bottom end of shaft 41 incorporates a gear 42 in engagement with a second gear 43 mounted on shaft 44 which shaft 44 is driven by additional power means to be described hereinafter with reference to Fig. 2 of the drawings.

With particular reference to Fig. 2 of the drawings, it is clearly seen that the power means for raising and lowering platform 26 further includes a relatively large gear wheel 45 mounted on the opposite end of shaft 44, a relatively small gear 46 mounted on motor shaft 47 in engagement with gear wheel 45, and motor 48. A second motor 49 is utilized for repositioning cutting wire 9 in order to eliminate excessive wear on any localized portion thereof. Said second motor 49, as clearly seen in Fig. 2, drives the drive pinion gear 50 through its motor shaft 51 which pinion gear 50, in turn, is engaged with drum gear 52 mounted on the shaft 53 of driving drum 11. In order to ensure positive engagement or clutching between pinion gear 50 and drum gear 52, a tension assembly indicated generally at 54 is utilized which tension assembly 54 will be described hereinafter with reference to Fig. 3 of the drawings. The motor 24 provides the main crystal cutting operation by means of its driving connection with carriage 13 as previously described whereas motor 48 assists during said cutting operation through its connection with platform 26 to raise the latter and thereby apply constant upward pressure on crystal 14.

In order to provide necessary tension on cutting wire 9, the tension system indicated at 55 in Figs. 1 and 3 of the drawings is utilized in the present invention in connection with supply spool 10. Said tension system 55 is substantially similar to the tension system 54 previously mentioned. Differences between them will be pointed out in connection with Fig. 3 of the drawings. Each of said tension systems 54 and 55 is rigidly attached to panel 2 by means of an identical bracket 56 which bracket 56 also incorporates an adjustment knob 57 wherein the tension may be varied. A first connector 58 for each tension system 54, 55 is attached to its respective bracket 56 at one end and to the other end thereof, one end of a spring 59 is affixed. With the spring 59 of tension system 54, the other end of said spring 59 is attached directly to the shaft of the winding drum 11 to retain gear 52 in engagement wtih said drive pinion gear 50. As previously described; however, with tension system 55, the other end of its spring 59 is attached to one end of a flat webbing 60 by means of a U-shaped connector 61. Said webbing 60 is looped over a drum portion of the supply spool 10 in resilient contact therewith and is affixed at its other end to panel 2 at 62. In addition, a pointer indicator 63, to which a handle 64 is attached, is positioned on supply spool 10. Handle 64 is utilized for the purpose of declutching the engagement between drum gear 52 and drive pinion gear 50 in order to rewind cutting wire 9 on supply spool 10.

As previously described, the carriage 13 is mounted for guidance during its horizontal reciprocation by the guidance system indicated generally at 12. Said guidance system 12 includes a pair of parallel guide rods 65 positioned at each end in aligned openings 66 in the brackets 67 mounted on panel 2. Said guide rods 65, also, engage in the relatively large aligned guide openings 68 incorporated in carriage 13, as seen clearly in Fig. 4 of the drawings. In addition, carriage 13 utilizes a relatively small center opening 69 for the purpose of receiving the reciprocating drive member 19 (Fig. 1), which drive member 19 is affixed therein by means of set screws 13a and 13b. Moreover, carriage 13 includes two projections at 13c and 13d which projections 13c and 13d incorporate the already-mentioned clearance holes 17 for the reception of platform-supporting leg 16.

In the lower portion of mounting panel 2 are positioned a pair of slots 70 which slots 70 permit adjustment of the motor mount of motor 48 in order to change the gear ratio between gears 45 and 46. In order to either increase or reduce the speed with which platform 26 is raised, the spacing between motor shaft 47 and shaft 44 may be reduced by virtue of slots 70 and the gear 46 changed accordingly in order to synchronize the upward speed thereof relative to the rate of reciprocation of the carriage 13 and the cutting speed of wire 9. Moreover, because of the relationship between the drum mounting plate 6, screws 8 and slots 4 and 7 in mounting panel 2, cutting wire 9 may be raised or lowered as a unit to conform with the height of the crystal to be cut.

To summarize the operation of the crystal cutting saw assembly of the present invention, the main crystal cutting motor 24 is actuated to reciprocate carriage 13 through means of drive member 19 and thereby effect positive cutting of crystal 14 by one or more strands of the cutting wire or saw member 9. Motor 48 is coordinated with the positive cutting effected by motor 24 to provide a gradual upward movement of the platform 26 to exert a constant pressure on crystal 14 on the cutting wire 9 during the main cutting operation. Simultaneously, motor 49 is operated in coordination with motors 24 and 48 to constantly reposition or advance the surface of the wire 9 at the cutting area.

Thus, a unique and yet simplified mechanism has been developed in the instant invention for cutting the very hard but brittle-type of crystal, especially the cadmium sulfide (CdS) crystal, wherein the probability of splitting or shattering is eliminated. Furthermore, an improved device has been effected wherein cutting of crystals of different sizes is facilitated, a plurality of simultaneous cuts may be made with no more difficulty than for a single cut, and crystals of different widths may be cut. Moreover, various modifications and changes may be made by those skilled in the art without departing from the spirit and scope of the invention as defined by the accompanying claims.

We claim:

1. Means for cutting a cadmium sulfide crystal comprising a mounting panel having a plurality of openings incorporated therein, a plate positioned behind said mounting panel, a plurality of spaced drums pivotally mounted on shafts affixed to said plate and extending through said slots, a supply spool mounted on said panel, cutting wire extending from said supply spool and threaded on each of said drums, a carriage mounted on said panel for horizontal reciprocation between said drums, a crystal-mounting platform attached to said carriage in a cutting position for reciprocation therewith, said platform adapted to support a crystal thereon in the path of said cutting wire, first means for reciprocating said carriage, and second means adapted to apply pressure on said crystal against said cutting wire to assist said first means in cutting said crystal.

2. Means for cutting a cadmium sulfide crystal as in claim 1, and means advancing unworn wire to said cutting position to prevent excessive wear on said cutting wire.

3. In a machine for cutting crystals, a main support element having a plurality of rotatably mounted wire supports, a source of wire supply, a wire extending from said source and threaded around and between each of said wire supports, a crystal support adaptable for mounting a crystal in cutting position in the path of said wire, means horizontally reciprocating said crystal support against the pressure of said wire cutting said crystal, and means moving said crystal support in a vertical direction exerting a constant pressure on said crystal during said crystal cutting.

4. In a machine for cutting crystals as in claim 3, said first-named means comprising a carriage mounting said crystal support, means guiding said carriage during said reciprocation mounted on said main support element, a main drive element rigidly attached to said carriage, interconnecting linkage attached at one end to said main drive element, and power means attached to the other end of said drive element.

5. In a machine for cutting crystals as in claim 3, said last-named means comprising an elongated leg depending from said crystal support and having a roller affixed to the end thereof, a platform supporting said roller, interconnecting linkage having a pair of cross links pivoted to each other supporting said platform, a cylindrical sleeve mounted on the pivot between said cross links, a first rotatably mounted shaft in threaded engagement with said sleeve at one end thereof, a gear mounted on said shaft at the other end thereof, a second motor-driven shaft having a second gear in engagement with the gear on said first shaft, and a motor driving said second shaft.

6. A device for cutting crystals comprising a main support having a plurality of openings incorporated therein in spaced relation, a secondary support mounted adjacent to said main support having a plurality of grooved rotatably mounted drums mounted on shafts affixed in spaced relation thereto and extending through said openings in slidable engagement with said main support, a supply spool, cutting-wire leading from said supply spool and threaded a plurality of turns around each of said drums, a second spool receiving the end of said cutting-wire remote from said supply spool, means mounting a crystal in the path of said wire for reciprocation during the cutting operation, means reciprocating said last-named means simultaneously with means imparting movement at right angles to said reciprocation to cut said crystal into a plurality of segments, and means ensuring that said wire is not excessively worn at the cutting position, said last-named means comprising an arm hinging said receiving spool to said main support, a gear affixed to said receiving spool, a drive pinion in engagement with said gear, a driven shaft mounting said drive pinion, motor means driving said driven shaft, tension means between said receiving spool and said main support positively clutching said spool gear with said drive pinion, and means initially declutching said spool gear from said drive pinion and subsequently rewinding said cutting-wire on said supply spool.

7. In a crystal cutting device as in claim 6, and additional openings in said main mounting plate in slidable engagement with screws on said second plate repositioning said cutting wire relative to the height of said crystal.

8. In a crystal cutting device as in claim 6, said means reciprocating said crystal mount comprising a drive member affixed to said crystal mount, and interconnecting means consisting of a relatively small disc in threaded engagement with said drive member, an interconnecting link eccentrically pivoted at one end to said small disc, a relatively large disc eccentrically pivoted to said link at the other end, a motor shaft mounting said relatively large disc, and a motor actuating said shaft to operate said drive member through said interconnecting means.

9. A crystal cutting device as in claim 6, said supply spool having tension means affixed thereto to assure proper threading of said cutting wire, said tension means comprising a spring, a first connector attached to one end of said spring affixed to said mounting plate, a second connector attached to the other end of said spring, and a flat webbing looped over said spool in resilient contact with said supply spool and attached at one end to said second connector and at the other end to said mounting plate.

10. A support having a crystal cutting station, a cutting wire tensioned across said cutting station, means for uniformly advancing said wire through said cutting station, means for uniformly tensioning said wire during the advancing thereof through said cutting station, crystal supporting means movably carried by said support, means on said support for advancing said supporting means toward said cutting wire to cut a crystal carried by said crystal support, and means for simultaneously reciprocating said supporting means in a direction parallel to said cutting wire during movement of said supporting means toward said cutting wire.

11. A support as in claim 10, said cutting wire being looped around said supporting means to provide a plurality of crystal cutting strands.

No references cited.